(12) United States Patent
Inoguchi (10) Patent No.: US 7,525,740 B2
(45) Date of Patent: Apr. 28, 2009

(54) DISPLAY OPTICAL SYSTEM AND IMAGE DISPLAY APPARATUS

(75) Inventor: Kazutaka Inoguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/166,459

(22) Filed: Jul. 2, 2008

(65) Prior Publication Data
US 2009/0009877 A1  Jan. 8, 2009

(30) Foreign Application Priority Data
Jul. 4, 2007   (JP)   ............................. 2007-176626

(51) Int. Cl.
*G02B 17/00* (2006.01)
(52) U.S. Cl. ................... 359/726; 359/730; 359/631
(58) Field of Classification Search ............... 359/250, 359/261, 267, 727–731, 630–631
See application file for complete search history.

(56) References Cited

U.S. PATENT DOCUMENTS

| 2004/0119664 A1 * | 6/2004 | Inoguchi et al. ................. 345/8 |
| 2007/0109658 A1 * | 5/2007 | Inoguchi et al. ............. 359/631 |

FOREIGN PATENT DOCUMENTS

JP   2003-149593 A   5/2003

* cited by examiner

*Primary Examiner*—Jordan M. Schwartz
*Assistant Examiner*—James C Jones
(74) *Attorney, Agent, or Firm*—Locke Lord Bissell & Liddell LLP (57) ABSTRACT

The display optical system includes first to third surfaces each having at least a reflection function, and a fourth surface having a reflection function and disposed outside an inside area surrounded by the first to third surfaces. The light from an original image passes through the inside area and is reflected by the fourth surface to return into the inside area. The light that has returned into the inside area is reflected by the first surface and is reflected by the second surface toward the first surface to impinge again thereon. The light impinging again on the first surface is re-reflected thereby such that a central-viewing-angle principal ray of the light proceeds in a direction opposite to a direction in which that principal ray has previously reflected by the first surface. The light re-reflected by the first surface is reflected by the third surface toward an exit pupil.

4 Claims, 8 Drawing Sheets

DISPLAY OPTICAL SYSTEM AND IMAGE DISPLAY APPARATUS

BACKGROUND OF THE INVENTION

The present invention relates to a display optical system that provides to an observer an enlarged image of an original image formed on an image-forming element such as a liquid crystal display element. More particularly, the invention relates to a display optical system suitable for an image display apparatus such as a head mounted display (HMD).

An HMD is desired to provide a wider viewing angle for a higher realistic sensation and have a reduced apparatus size. Further, the HMD mounted on a head (in front of eyes) of an observer is particularly desired to be thin in view of weight balance on the head.

A simple solution to meet the demand for a wider viewing angle would be to use a large image-forming element that forms the original image, which, however, is not preferable because such a large image-forming element would invite a cost increase. To widen the viewing angle using a small image-forming element, an image-forming optical system that forms an intermediate real image of the original image once and provides an enlarged virtual image of the intermediate real image is more suitable than an image-forming optical system that forms no intermediate real image and provides an enlarged virtual image of the original image to an observer. The problem with the image-forming optical system that forms the intermediate image once is that the number of constituent elements is large and an optical path of the optical system is long, meaning the system tends to be bulky and heavy.

An HMD designed to achieve a wider viewing angle and smaller size is disclosed, for example, in Japanese Patent Laid-Open No. 2003-149593. In this HMD, a shuttling optical path is formed using a returning reflective surface and decentered reflective surfaces through which the light passes before and after the returning reflective surface, and thereby a long optical path necessary for forming one intermediate image is accommodated within a small optical system.

However, even this HMD disclosed in Japanese Patent Laid-Open No. 2003-149593 has not achieved a sufficiently wide viewing angle and a sufficient size reduction.

BRIEF SUMMARY OF THE INVENTION

The present invention provides a display optical system that can realize a small image display apparatus with an even wider viewing angle than those of conventional ones, or a display optical system that can realize an even smaller image display apparatus with a viewing angle equivalent to those of conventional ones.

The present invention provides, according to an aspect thereof, a display optical system that introduces light from an original image to an exit pupil. The display optical system includes a first surface, a second surface, and a third surface each having at least a reflection function, and a fourth surface having a reflection function and disposed outside an inside area surrounded by the first, second, and third surfaces. The display optical system is configured such that: the light from the original image passes through the inside area and then is reflected by the fourth surface to return into the inside area; the light that has returned into the inside area is reflected by the first surface and then is reflected by the second surface toward the first surface to impinge again thereon; the light impinging again on the first surface is re-reflected thereby such that a central-viewing-angle principal ray of the light proceeds in a direction opposite to, with respect to a normal to the first surface at its hit point thereon, a direction in which the central-viewing-angle principal ray has previously reflected by the first surface; and the light re-reflected by the first surface is reflected by the third surface to proceed toward the exit pupil.

The present invention provides, according to another aspect thereof, an image display apparatus including an image-forming element that forms an original image, and the above-described display optical system.

Other aspects of the present invention will be apparent from the embodiments described below with reference to the drawings.

DETAILED DESCRIPTION OF THE EMBODIMENTS

Exemplary embodiments of the present invention will be described below with reference to the accompanied drawings.

Embodiment 1

Figure 1:
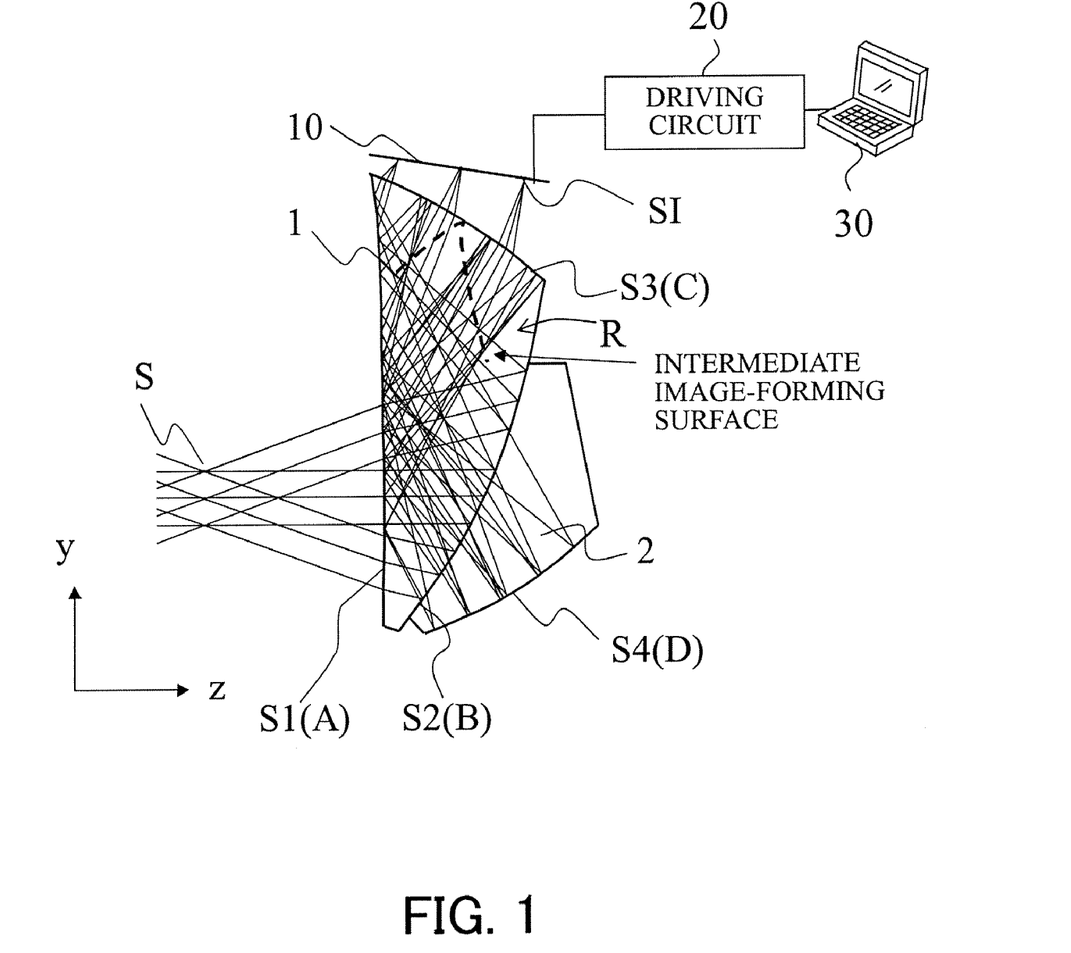
FIG. 1 is a sectional view of a display optical system that is a first embodiment (Embodiment 1) of the present invention and an image display apparatus using the same.

FIG. 1 shows the configuration of an image display apparatus that uses a display optical system which is a first embodiment (Embodiment 1) of the present invention. The image display apparatus in this embodiment is configured to be suitable particularly for an HMD.

In FIG. 1, reference numerals 1 and 2 denote a first optical element and a second optical element, respectively. Reference numeral 10 denotes an image-forming element such as a liquid crystal display element or an organic EL element that displays an original image. Reference symbol S denotes an exit pupil of the display optical system.

The image-forming element 10 is connected to a driving circuit 20. The driving circuit 20 drives the image-forming element 10 to form an original image thereon in accordance with image signals sent from an image supply apparatus 30 such as a personal computer, a DVD player or a television tuner. The image display apparatus and the image-forming element 10 constitute an image display system. This will apply to all the other embodiments described later, although not shown in the drawings.

The first optical element 1 is a prism-shaped element having the following three optical surfaces: a surface S1 (A) that is a first surface; a surface S3 (C) that is a second surface; and a surface S2 (B) that is a third surface. An inside area R surrounded by these three optical surfaces S1 to S3 is filled with a medium having a refractive index of n(>1). In the description below, the inside area R will be referred to simply as "area R".

The second optical element 2 is a lens-shaped element having the following two optical surfaces: a surface B; and a surface S4 (D) that is a fourth surface. The second optical element 2 is filled thereinside with a medium having a refractive index of n(>1). The second optical element 2 is cemented to the first optical element 1 at the surface S2. In the following description, the surfaces S1, S2, S3, and S4 will be referred to as surface A, surface B, surface C, and surface D, respectively.

Each of the surfaces A, B, and C has at least a reflection function; in this embodiment, each has both a transmission function and the reflection function. The surface D has only a reflection function. The surface D is located outside the area R surrounded by the surfaces A, B, and C.

In this embodiment, the surfaces B and C are formed thereon with a half-transmissive reflective film. The surface A, on the other hand, has no such reflective film on it.

Figure 2:
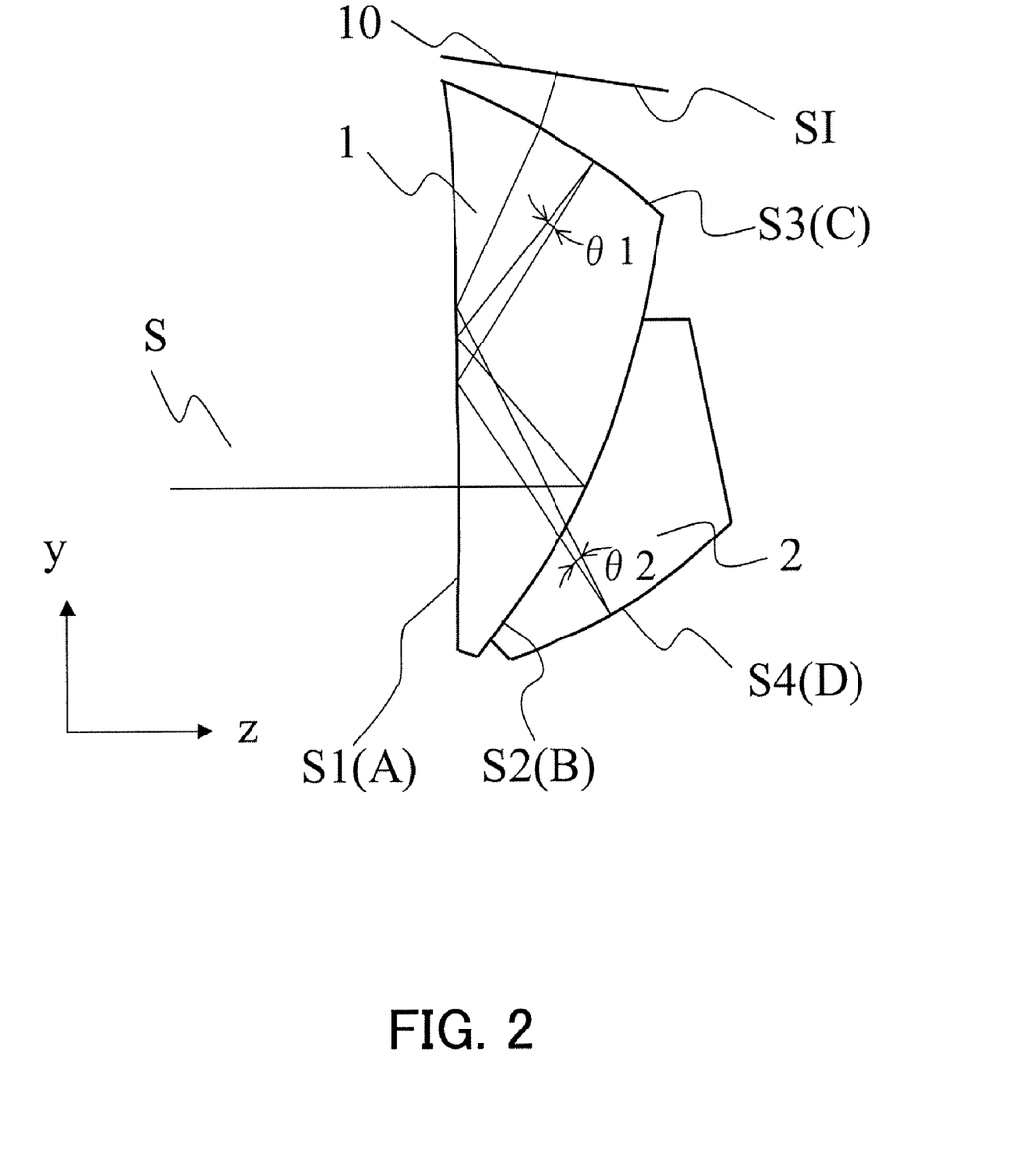
FIG. 2 is a sectional view showing an optical path of a central-viewing-angle principal ray in Embodiment 1.

FIG. 2 shows an optical path of a principal ray at a central viewing angle (hereinafter referred to as a central-viewing-angle principal ray) in this embodiment. The central-viewing-angle principal ray means a principal ray emerging from the center of the original image and then reaching the center of the exit pupil S. The central-viewing-angle principal ray is included light or a light flux in the following description.

Light that has emerged from the image-forming element 10 (surface SI) enters the first optical element 1 (i.e., area R surrounded by the surfaces A to C), and impinges on the surface A at an incident angle of arcsin (1/n) or more. After being internally totally reflected at the surface A, the light is transmitted through the surface B to emerge from the first optical element 1. The light that has emerged from the first optical element 1 enters the second optical element 2. In other words, the light that has emerged from the image-forming element 10 first passes through the first optical element 1 (area R) and then proceeds toward the surface D of the second optical element 2.

The light that has entered the second optical element 2 and reflected by the surface D is transmitted through the surface B to return into the first optical element 1 (area R) again. The light that has returned into the first optical element 1 impinges on the surface A at an incident angle of arcsin (1/n) or more to be internally totally reflected thereby to proceed toward the surface C. The light reflected by the surface C impinges on the surface A at an incident angle of arcsin (1/n) or more to be internally totally reflected thereby and then is reflected by the surface B. The light reflected by the surface B impinges on the surface A at an incident angle smaller than the angle of arcsin (1/n) to be transmitted therethrough toward the exit pupil S.

Figure 3:
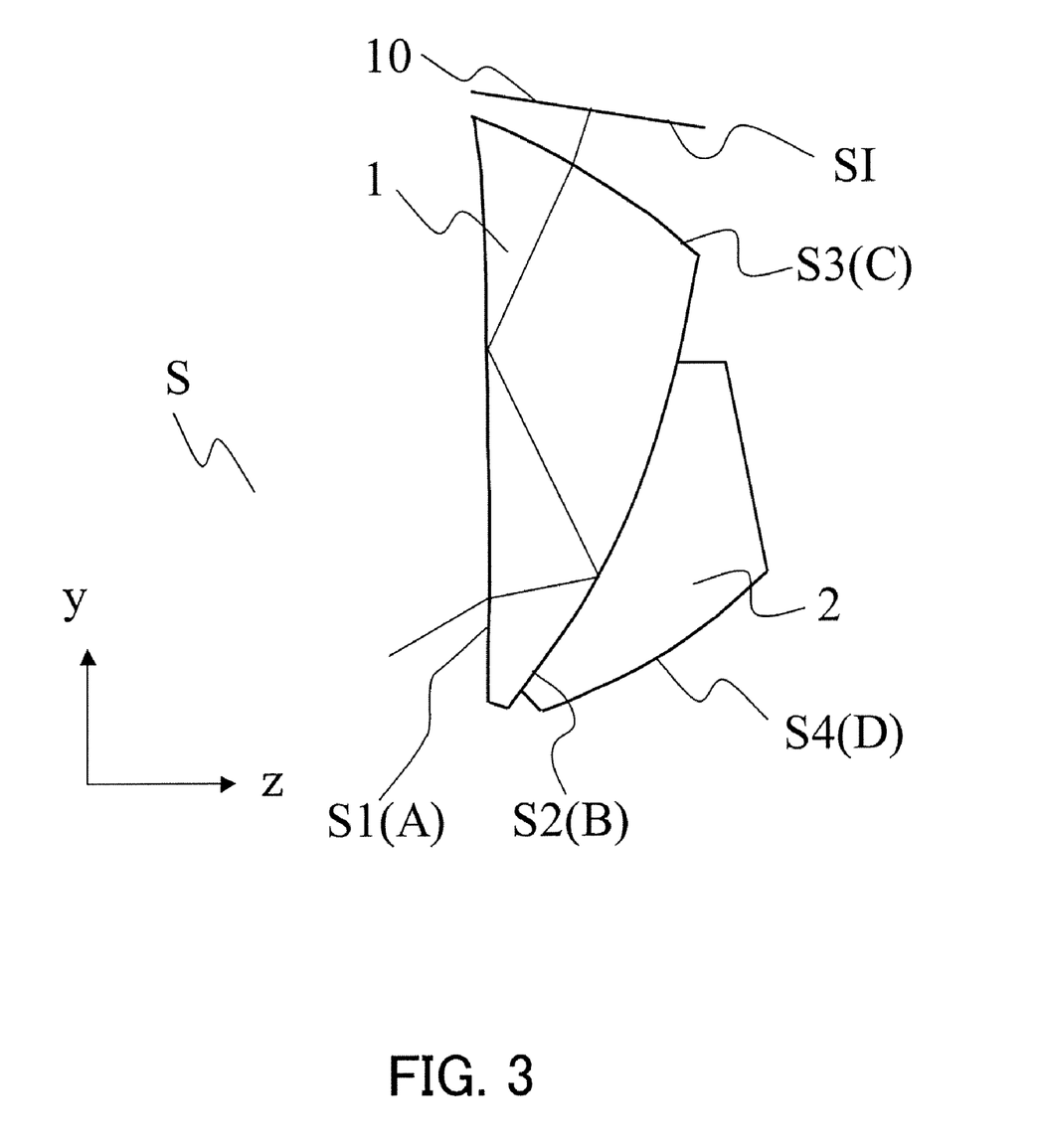
FIG. 3 is a diagram for explaining unnecessary light in Embodiment 1.

FIG. 3 shows an example of unnecessary light that is not used for image display. This unnecessary light that has emerged from the image-forming element 10 and then first impinges on the surface B is not transmitted through the surface B but is reflected thereby, and is subsequently transmitted through the surface A to proceed in a direction different from the exit pupil S. In this embodiment, as described above, the respective surfaces are arranged so that the unnecessary light does not proceed toward the exit pupil S.

In this embodiment, the surfaces A, B, C, and D are all decentered relative to the central-viewing-angle principal ray. That is, the central-viewing-angle principal ray does not perpendicularly impinge on the respective surfaces A to D to be perpendicularly reflected thereby, but impinges thereon at a predetermined angle to be reflected thereby. In particular, referring to FIG. 2, an angle θ1 formed by a portion of the central-viewing-angle principal ray proceeding toward the surface C and a portion thereof immediately after being reflected by the surface C and an angle θ2 formed by a portion of the central-viewing-angle principal ray proceeding toward the surface D and a portion thereof immediately after being reflected by the surface D preferably satisfy the following condition:

$$\theta 1+\theta 2>10° \tag{1}$$

Satisfying this condition makes it possible that the light that has emerged from the image-forming element 10 and first impinges on the surface B does not proceed toward the exit pupil S through the surface A after being reflected by the surface B. That is, the unnecessary light is prevented from being observed by an observer as ghost light or flare light.

In this embodiment, the surfaces A, B, C, and D are all curved surfaces having a curvature. Respective functions of these curved surfaces enable the observer to observe an enlarged image of the original image formed on the image-forming element 10.

Figure 4:
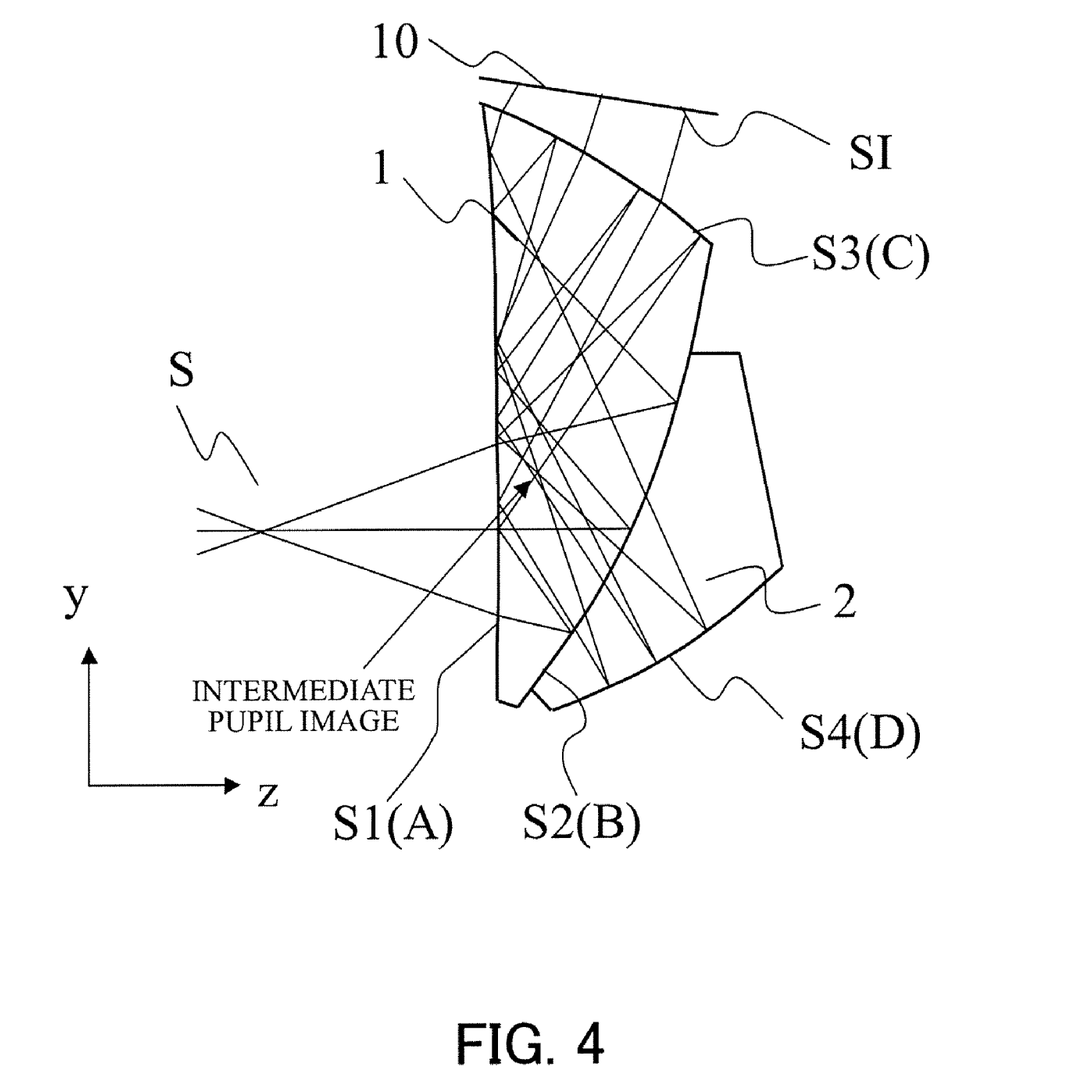
FIG. 4 is a sectional view showing an optical path of a principal ray in Embodiment 1.
Figure 5:
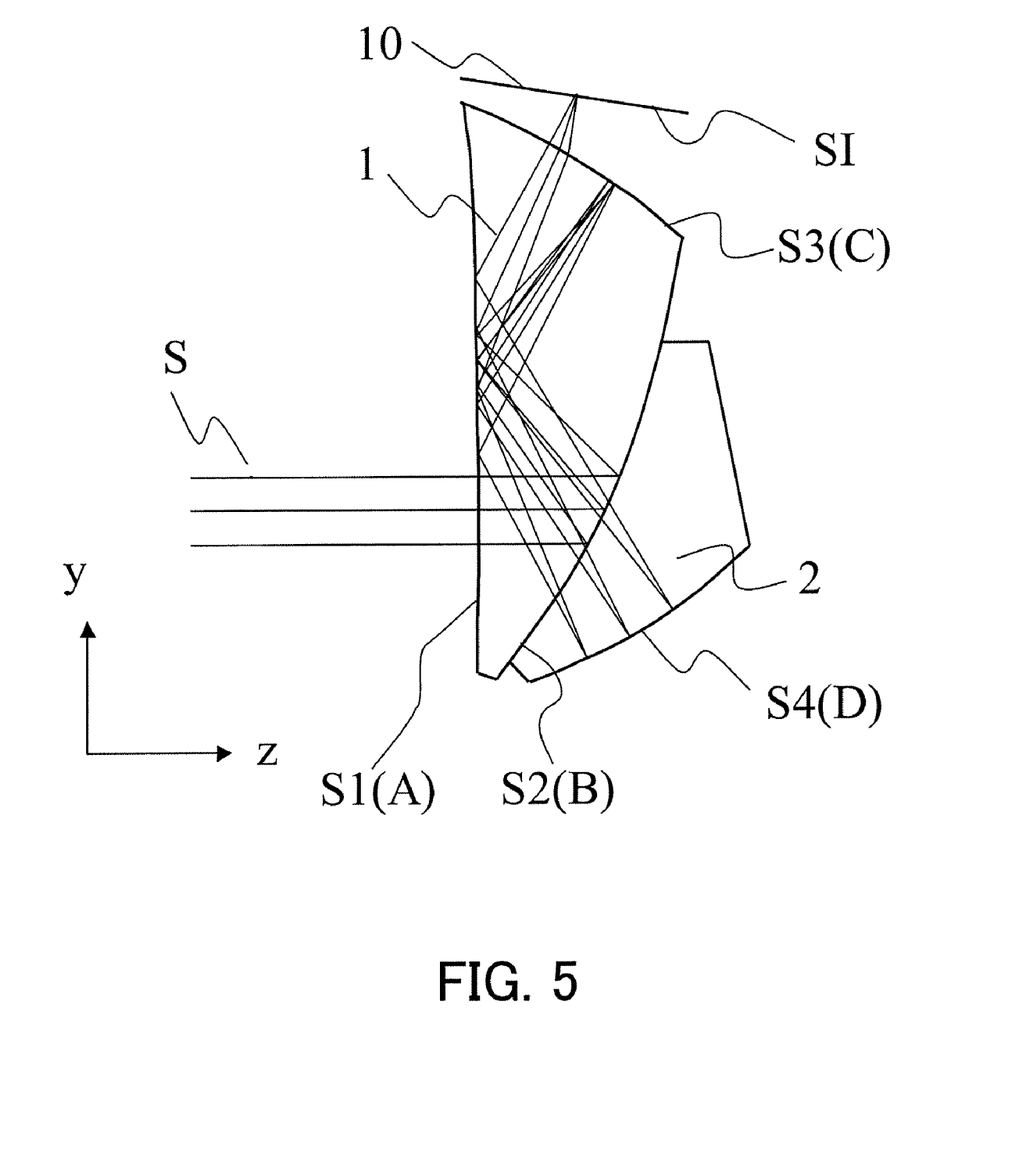
FIG. 5 is a sectional view showing optical paths of the central-viewing-angle principal ray and marginal rays in Embodiment 1.

How image formation is performed in this embodiment will be described below with reference to FIGS. 1, 2, 4, and 5. FIG. 4 shows optical paths of principal rays, and FIG. 5 shows optical paths of the central-viewing-angle principal ray and marginal rays.

A light flux that has emerged from the image-forming element 10 enters the first optical element 1 with divergence reduced due to a convex lens effect of the surface C. The light flux is transmitted through the surface B after internal total reflection at the surface A having a small curvature, and then enters the second optical element 2 to proceed toward the surface D.

The light flux is reflected by the reflective surface D while being subjected to a collecting effect by a concave surface shape thereof and then is transmitted through the surface B to form an intermediate pupil image. The light flux from the intermediate pupil image is internally totally reflected by the surface A and then is reflected again by the surface C. The light flux further collected by the reflective surface C having a concave surface shape forms an intermediate image. In this embodiment, part of the light flux forming an upper viewing angle (positive viewing angle in a y-axis direction) forms the intermediate image before being reflected by the reflective surface C. Thus, strictly speaking, an intermediate image-forming surface (surface formed by connecting points at which effective light fluxes forming respective viewing angles are collected) is formed over front and back of the reflective surface C.

The light flux that has formed the intermediate image is internally totally reflected by the surface A and then is reflected by the reflective surface B having a concave surface shape. This light flux then emerges from the surface A to form the exit pupil S. The observer who places his/her eye at the position of the exit pupil S can observe an enlarged virtual image of the intermediate image primarily by the function of the reflective surface B having a concave surface shape with a large curvature.

It is preferable that the light flux folded by the reflective surfaces A and B after forming the intermediate image form its optical path such that part of that light flux crosses part of the intermediate image. In this embodiment, the light flux forming the upper viewing angle (positive viewing angle in the y-axis direction) crosses the intermediate image of a lower viewing angle (negative viewing angle in the y-axis direction). Such a configuration can reduce the size of the first optical element 1, which in turn is effective for miniaturizing the entire display optical system.

The first optical element 1 in this embodiment includes a part serving as an ocular optical system and another part serving as a relay optical system. The ocular optical system introduces the light flux after forming the intermediate image toward the exit pupil S (part from the third internal total reflection on the surface A via the reflection on the surface B to the transmission through the surface A). The first optical element 1 is surrounded by the three surfaces A, B, and C each having at least a reflection function. The part serving as the ocular optical system in the first optical element 1 also folds the optical path of effective light in a visual axis direction (z-axis direction) by the third internal total reflection on the surface A and the reflection on the surface B. This enables reduction in thickness of the display optical system.

Moreover, in the first optical element 1, the light (central-viewing-angle principal ray) after forming the intermediate image returns on the optical path on which it has proceeded before forming the intermediate image (optical path from the surface B [transmission] to the surface A [second internal total reflection]) to proceed from the surface A (third internal total reflection) to the surface B (reflection). That is, the first optical element 1 has the surface C as a returning reflective surface that causes the light to return on the optical path as described above.

In this embodiment, the optical path from the surface A (second internal tonal reflection) via the surface C (reflection) to the surface A (third internal total reflection) corresponds to a shuttling optical path formed between the first and second surfaces.

The following effect is defined as a returning reflective effect of the surface C. The reflection direction of the central-viewing-angle principal ray with respect to a normal to the surface A at its hit point thereon when the light is internally totally reflected by the surface A for the second time is defined as a first reflection direction. Likewise, the reflection direction of the central-viewing-angle principal ray with respect to a normal to the surface A at its hit point thereon when the light reflected by the surface C is internally totally reflected (re-reflected) by the surface A for the third time is defined as a second reflection direction. The returning reflective effect of the surface C is an effect that causes the light to be reflected such that the first and second reflection directions are opposite to each other.

In other words, the returning reflective effect of the surface C reflects the light such that the central-viewing-angle principal ray of the light impinging (again) on the surface A proceeds (is re-reflected) in a direction (negative side in the y-axis direction) opposite to, with respect to the normal to the surface A at its hit point thereon, a direction (positive side in the y-axis direction) in which the central-viewing-angle principal ray has previously reflected by the surface A.

In this embodiment, this returning reflective effect of the surface C enables the optical path in the relay optical system, in particular the optical path from an intermediate pupil-image-forming position (position where the principal rays forming respective viewing angles are collected) to the intermediate image-forming surface, and the optical path in the ocular optical system to be arranged within the first optical element 1. This enables miniaturization of the entire display optical system.

This embodiment further includes the surface D outside the area R surrounded by the three surfaces A, B, and C. The surface D is provided to configure the display optical system such that the light that has emerged from the image-forming element 10 and passed through the first optical element 1 (area R) once is returned into the first optical element 1 to form the intermediate pupil image. The surface D in this embodiment also has the effect of causing the light after the first internal total reflection on the surface A to return to the surface A for the second internal total reflection.

Here, the reflection direction of the central-viewing-angle principal ray with respect to a normal to the surface A at its hit point thereon when the light is internally totally reflected by the surface A for the first time is defined as a third reflection direction. Likewise, the reflection direction of the central-viewing-angle principal ray with respect to the normal to the surface A at its hit point thereon when the light reflected by the surface D is internally totally reflected by the surface A for the second time is defined as a fourth reflection direction. The third and fourth reflection directions are opposite to each other. In other words, the surface D is disposed so as to cause the central-viewing-angle principal ray of the light impinging (again) on the surface A to proceed (be re-reflected) in a direction opposite to, with respect to the normal to the surface A at its hit point thereon, a direction in which the central-viewing-angle principal ray has previously reflected by the surface A.

This means that the surface D also has the returning reflective function. This enables the above-mentioned shuttling optical path from the surface B (transmission) via the surface A (second internal total reflection), the surface C (reflection) and the surface A (third internal total reflection) to the surface B (reflection), and the optical path from the surface C (transmission) via the surface A (first internal total reflection) to the surface B (transmission) to be arranged within the first optical element 1. The display optical system is thus reduced in size.

Furthermore, in the area R surrounded by the three surfaces A, B, and C, the following three optical paths overlap each other: an earlier optical path portion from the original image to the intermediate pupil-image-forming position in the relay optical system from the original image to a position where the intermediate image is formed (hereinafter referred to as intermediate image-forming position); a later optical path portion from the intermediate pupil-image-forming position to the intermediate image-forming position in the relay optical system; and the optical path in the ocular optical system. With regard to the optical path of the central-viewing-angle principal ray, the earlier and later optical path portions in the relay optical system and the optical path in the ocular optical system intersect each other within the area R surrounded by the three surfaces A, B, and C. In other words, the light has entered the area R from the original image emerges from the area R by passing through at least part of the shuttling optical path formed after the reflection on the surface D, i.e., the optical path of the light that is reflected by the surface A, subsequently reflected by the surface C and then impinges again on the surface A.

Such a long optical path is thus formed within the small area R with this configuration, resulting in miniaturization of the entire display optical system. Conversely, the optical path length is increased relative to the size of the display optical system. This reduces the sensitivity of the optical surfaces, thereby enabling realization of a display optical system whose tolerance level is lowered, that is, a display optical system more easily producible.

Since the surfaces A, B, C, and D are decentered reflective surfaces having a curvature, decentering aberrations are generated by these surfaces A, B, C, and D. It is therefore preferable to form these surfaces A, B, C, and D in a rotationally asymmetric shape to correct the decentering aberrations. Particularly, a large decentering aberration is generated by the surface B having a large curvature and being largely decentered relative to the light reflected thereby. Therefore it is crucial to form the surface B in a rotationally asymmetric shape to correct the decentering aberration in order to achieve good optical performance of the display optical system. Forming the surfaces other than the surface B in a rotationally asymmetric shape to correct the decentering aberrations increases the degree of freedom in aberration correction, which effectively improves the optical performance.

In this embodiment, some loss of light amount is generated by the reflection and transmission at the surfaces B and C each being a half-transmissive reflective surface. However, this embodiment reduces the loss of light amount by forming the first optical element 1 in a prism shape and by making the three reflections at the surface A all internal total reflection.

Note that the reflection at the surface A is not limited to the internal total reflection. The surface A can be a half-transmissive reflective surface to arbitrarily cause effective light used for image display to be reflected thereby or transmitted therethrough such that an optical path similar to that described in this embodiment is formed.

While the surfaces A, B, C, and D are all reflective surfaces decentered relative to the central-viewing-angle principal ray in this embodiment, the surfaces C and D are not limited thereto. For example, even if the surface C is a non-decentered reflective surface which reflects the central-viewing-angle principal ray such that θ1=0, satisfying the above condition (1) can prevent the central-viewing angle principal ray that emerges from the image-forming element 10 and first impinges on the surface B from being observed by the observer as ghost light or flare light.

While the surfaces A, B, C, and D are all surfaces having a curvature in this embodiment, one of these may be a planar surface. It is, however, preferable that all of these surfaces have a curvature since they can contribute to image formation and aberration correction, which makes it easier to configure a display optical system with high image forming performance.

While the first and second optical elements 1 and 2 are made of materials having the same refractive index n, they may be formed of materials having different refractive indexes n1 and n2 from each other.

Embodiment 2

Figure 6:
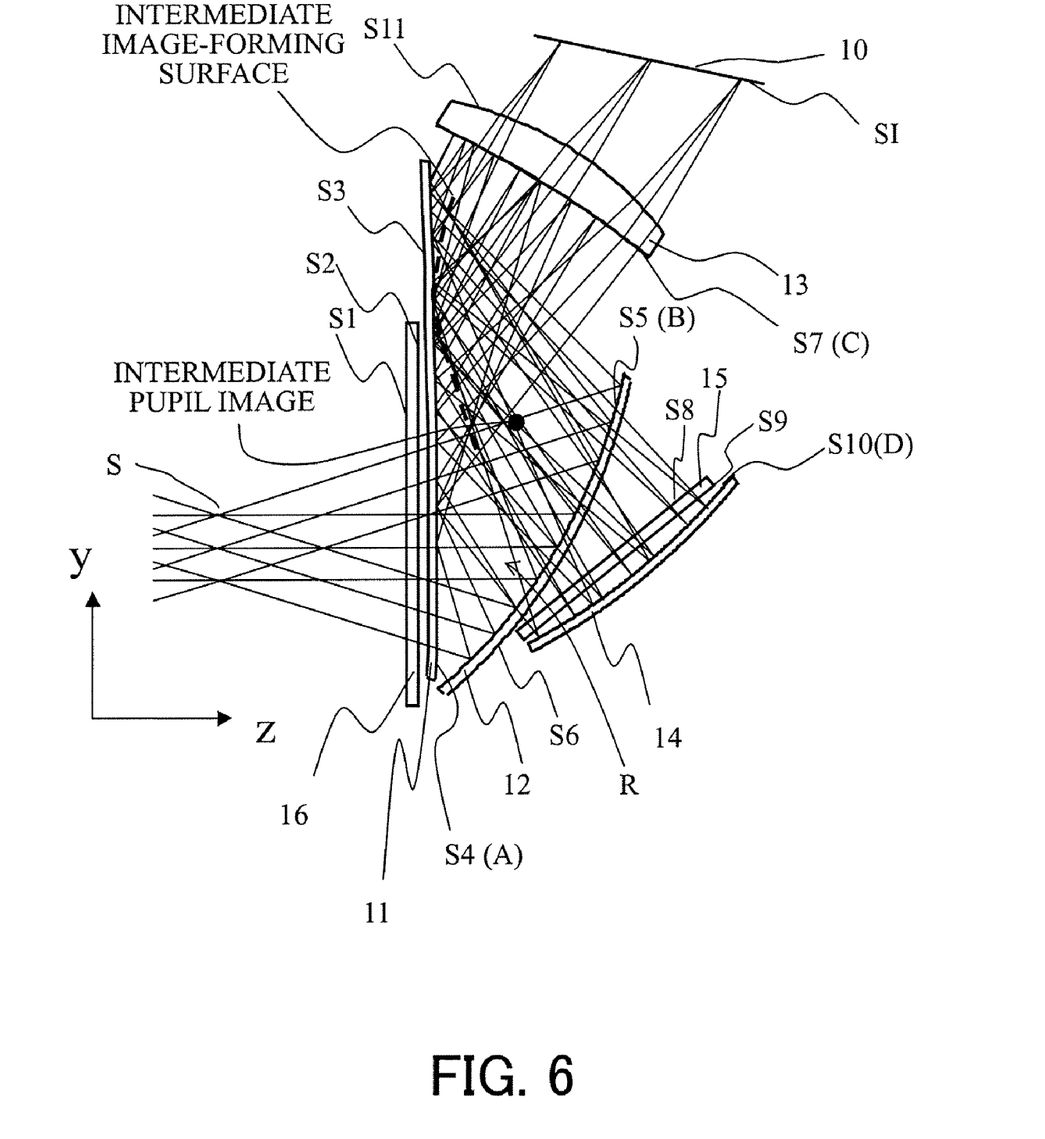
FIG. 6 is a sectional view of a display optical system that is a second embodiment (Embodiment 2) of the present invention and an image display apparatus using the same.

FIG. 6 shows the configuration of an image display apparatus using a display optical system that is a second embodiment (Embodiment 2) of the present invention.

This embodiment uses optical elements 11, 12, 13, and 14 reflecting a light flux on its outer surface, instead of the first and second optical elements 1 and 2 reflecting a light flux on its internal surface, which were described in Embodiment 1. Unlike Embodiment 1, this embodiment uses reflective surfaces having a reflecting effect provided by a polarization splitting function, and a polarization conversion element (phase plate) 15 converting a polarization direction of a light flux entering thereinto. This embodiment also uses a polarizing plate (polarizer) 16 that blocks unnecessary light.

The display optical system includes three surfaces S4 (A), S5 (B), and S7 (C) that are respectively provided to the optical elements 11, 12, and 13 and surrounds an area (space) R, and a surface S10 (D) that is disposed outside the area R. In the following description, the surfaces S4, S5, S7, and S10 are referred to as surface A, surface B, surface C, and surface D, respectively. Also in this embodiment, the surfaces A, C, B, and D respectively correspond to a first surface, a second surface, a third surface, and a fourth surface.

The surfaces A and B of the optical elements 11 and 12 are formed thereon with a half-transmissive reflective film so that these surfaces A and B serve as half mirrors. The surface C of the optical element 13 is provided with a polarization splitting function (polarization splitting film) so that this surface C serves as a polarization beam splitter (PBS). The polarization splitting function can be achieved by a multi-layer film, a minute periodic structure having a grating period smaller than the wavelength of light impinging thereon, or other known configurations.

The surface D of the optical element 14 is formed thereon with a reflective film. The phase plate 15 is a quarter-wave plate that converts linearly polarized light into circularly polarized light.

First, an optical path inside the display optical system and changes in the polarization direction will be described. Here, the polarized light that has an electric field vibration direction along the sectional direction of FIG. 6 is defined as P-polarized light, while the polarized light that has an electric field vibration direction perpendicular to that of the P-polarized light is defined as S-polarized light. The surface C serves as a polarization beam splitter (PBS) that transmits P-polarized light and reflects S-polarized light. The polarizing plate 16 transmits S-polarized light and absorbs P-polarized light.

Reference numeral 10 denotes an image-forming element that forms an original image. Reference symbol S denotes an exit pupil of the display optical system. P-polarized light that has emerged from the image-forming element 10 (surface SI) is transmitted through the optical element 13 to enter the area R surrounded by the surfaces A, B, and C. The P-polarized light that entered the area R is reflected by the surface A and then is transmitted through the surface B to emerge from the area R.

The P-polarized light that has passed through and emerged from the area R is converted into circularly polarized light by the quarter-wave plate 15. The circularly polarized light obtained by the quarter-wave plate 15 is reflected by the surface D and thereby its polarized direction is inversed, which then enters the quarter-wave plate 15 again to be converted into S-polarized light.

The S-polarized light that has emerged from the quarter-wave plate 15 is transmitted through the surface B and returns into the area R. It is then reflected by the surface A to proceed toward the surface C. The S-polarized light is reflected by the surface C, reflected by the surface A, and then reflected by the surface B. The S-polarized light reflected by the surface B is transmitted through the surface A and then transmitted through the polarizing plate 16 to be introduced to the exit pupil S. The optical path described above is that of effective light used for image display. An optical path of unnecessary light that is not used for image display is as follows.

P-polarized light that has emerged from the image-forming element 10 and then been transmitted through the optical element 13 and the surface A is absorbed by the polarizing plate 16.

P-polarized light that has been reflected by the surface A, reflected by the surface B and then transmitted through the surface A is also absorbed by the polarizing plate 16.

Light that has been reflected by the surface A, reflected by the surface B and then reflected again by the surface A proceeds, if it is reflected by the surface B, in a different direction from the exit pupil S through the optical path before the reflection on the surface B. If the light is transmitted through the surface B, then it is reflected by the surface D to proceed outside of the optical path to the exit pupil S. Therefore, the unnecessary light does not proceed toward the exit pupil S and is not observed by an observer.

Also in this embodiment, the surfaces A, B, C, and D are all curved surfaces having a curvature. Respective functions of these curved surfaces enable the observer to observe an enlarged image of the original image formed on the image-forming element 10.

How image formation is performed in this embodiment will be described below.

A light flux that has emerged from the image-forming element 10 enters the area R surrounded by the three surfaces A, B, and C with divergence reduced due to a convex lens effect of the optical element 13. After that, the light flux is reflected by the surface A having a small curvature, and then is transmitted through the surface B to emerge from the area R surrounded by the three surfaces A, B, and C toward the surface D.

The light flux is reflected by the reflective surface D while being subjected to a collecting effect by a concave surface shape thereof and then is transmitted through the surface B to return into the area R surrounded by the three surfaces A, B, and C. Then, the light flux is reflected by the surface A after forming an intermediate pupil image, and then is reflected again by the surface C.

The light flux further collected by the reflective surface C having a concave surface shape forms an intermediate image. In this embodiment, part of the light flux forming an upper viewing angle (positive viewing angle in a y-axis direction) is reflected by the reflective surface C and then is reflected again by the reflective surface A to form the intermediate image. Thus, strictly speaking, an intermediate image-forming surface (surface formed by connecting points at which effective light fluxes forming respective viewing angles are collected) is formed over front and back of the reflective surface A.

The light flux that has formed the intermediate image is reflected by the surface A and then is reflected by the reflective surface B having a concave surface shape. The light flux reflected by the reflective surface B is then transmitted through the surface A to emerge from the area R surrounded by the three surfaces A, B, and C, and then forms the exit pupil S. The observer who places his/her eye at the position of the exit pupil S can observe an enlarged virtual image of the intermediate image primarily by the function of the reflective surface B having a concave surface shape with a large curvature.

In this embodiment, the area R surrounded by surfaces A, B, and C contains a part serving as an ocular optical system and being provided after the position where the intermediate image is formed, and another part serving as a relay optical system. The ocular optical system is formed from the third reflection on the surface A via the reflection on the surface B to the transmission through the surface A.

The part serving as the ocular optical system folds an optical path of the effective light in a visual axis direction (z-axis direction) by the third reflection on the surface A and the reflection on the surface B. This enables reduction in thickness of the display optical system.

In this embodiment, in the area R, the light (central-viewing-angle principal ray) after forming the intermediate image returns on the optical path on which it has proceeded before forming the intermediate image (optical path from the surface B [transmission] to the surface A [second reflection]) to proceed from the surface A (third reflection) to the surface B (reflection). That is, this embodiment includes the surface C as a returning reflective surface that causes the light to return on the optical path as described above.

In this embodiment, the optical path from the surface A (second reflection) via the surface C (reflection) to the surface A (third reflection) corresponds to a shuttling optical path formed between the first and second surfaces.

The following effect is defined as a returning reflective effect of the surface C. The reflection direction of the central-viewing-angle principal ray with respect to a normal to the surface A at its hit point thereon when the light is reflected by the surface A for the second time is defined as a first reflection direction.

Likewise, the reflection direction of the central-viewing-angle principal ray with respect to a normal to the surface A at its hit point thereon when the light reflected by the surface C is reflected (re-reflected) by the surface A for the third time is defined as a second reflection direction. The returning reflective effect of the surface C is an effect that causes the light to be reflected such that the first and second reflection directions are opposite to each other.

In other words, the returning reflective effect of the surface C reflects the light such that the central-viewing-angle principal ray of the light impinging (again) on the surface A proceeds (is re-reflected) in a direction (negative side in the y-axis direction) opposite to, with respect to the normal to the surface A at its hit point thereon, a direction (positive side in the y-axis direction) in which the central-viewing-angle principal ray has previously reflected by the surface A.

In this embodiment, this returning reflective effect of the surface C enables the optical path in the relay optical system, in particular the optical path from an intermediate pupil-image-forming position (position where principal rays forming respective viewing angles are collected) to the intermediate image-forming surface, and the optical path in the ocular optical system to be arranged within the area R. This enables miniaturization of the entire display optical system.

This embodiment further includes the surface D outside the area R surrounded by the three surfaces A, B, and C. The surface D is provided to configure the display optical system such that the light that has emerged from the image-forming element 10 and passed through the area R once is returned into the area R to form the intermediate pupil image. The surface D in this embodiment also has the effect of causing the light after the first reflection on the surface A to return to the surface A for the second reflection.

Here, the reflection direction of the central-viewing-angle principal ray with respect to a normal to the surface A at its hit point thereon when the light is reflected by the surface A for the first time is defined as a third reflection direction. Likewise, the reflection direction of the central-viewing-angle principal ray with respect to the normal to the surface A at its hit point thereon when the light reflected by the surface D is reflected by the surface A for the second time is defined as a fourth reflection direction. The third and fourth reflection directions are opposite to each other. In other words, the surface D is disposed so as to cause the central-viewing-angle principal ray of the light impinging (again) on the surface A to proceed (be re-reflected) in a direction opposite to, with respect to the normal to the surface A at its hit point thereon, a direction in which the central-viewing-angle principal ray has previously reflected by the surface A.

This means that the surface D also has the returning reflective function. This enables the above-mentioned shuttling optical path from the surface B (transmission) via the surface A (second reflection), the surface C (reflection) and the surface A (third reflection) to the surface B (reflection), and the optical path from the surface C (transmission) via the surface A (first reflection) to the surface B (transmission) to be arranged within the area R. The display optical system is thus reduced in size.

Furthermore, in the area R surrounded by the three surfaces A, B, and C, the following three optical paths overlap each other: an earlier optical path portion from the original image to the intermediate pupil-image-forming position in the relay optical system from the original image to the intermediate image-forming position; a later optical path portion from the intermediate pupil-image-forming position to the intermediate image-forming position in the relay optical system; and the optical path in the ocular optical system.

With regard to the optical path of the central-viewing-angle principal ray, the earlier and later optical path portions in the relay optical system and the optical path in the ocular optical system intersect each other within the area R surrounded by the three surfaces A, B, and C. In other words, the light that has entered the area R from the original image emerges from the area R by passing through at least part of the shuttling optical path formed after the reflection on the surface D, i.e., the optical path of the light that is reflected by the surface A, subsequently reflected by the surface C and then impinges on the surface A.

Such a long optical path is thus formed within the small area R with this configuration, resulting in miniaturization of the entire display optical system. Conversely, the optical path length is increased relative to the size of the display optical system. This reduces the sensitivity of the optical surfaces, thereby enabling realization of a display optical system whose tolerance level is lowered, that is, a display optical system more easily producible.

Since the surfaces A, B, C, and D are decentered reflective surfaces having a curvature, decentering aberrations are generated by these surfaces A, B, C, and D. It is therefore preferable to form these surfaces A, B, C, and D in a rotationally asymmetric shape to correct the decentering aberrations. Particularly, a large decentering aberration is generated by the surface B having a large curvature and being largely decentered relative to the light reflected thereby. Therefore it is crucial to form the surface B in a rotationally asymmetric shape to correct the decentering aberration in order to achieve good optical performance of the display optical system. Forming the surfaces other than the surface B in a rotationally asymmetric shape to correct the decentering aberrations increases the degree of freedom in aberration correction, which effectively improves the optical performance.

In this embodiment, some loss of light amount is generated by the reflection and transmission at the surfaces A and B each being a half-transmissive reflective surface. However, this embodiment reduces the amount of light loss by forming the surface C as the PBS and by using the quarter-wave plate 15 that rotates the polarization direction of linearly polarized light by 90° before and after the reflection at the surface D.

While the surfaces A, B, C, and D are all reflective surfaces decentered relative to the central-viewing-angle principal ray in this embodiment, they are not limited thereto. This embodiment includes the polarizing plate 16 to prevent the unnecessary light from reaching the exit pupil S, thereby enabling prevention of recognition of the unnecessary light by the observer as ghost light or flare light, even if the above condition (1) mentioned in Embodiment 1 is not satisfied. This is advantageous as compared to Embodiment 1 in that, for example, the degree of freedom in the arrangement of the optical surfaces is increased and thereby it becomes easier to configure a display optical system having high image forming performance.

Therefore, the display optical system can be variously designed to cause the light that has entered the area R from the original image to proceed through at least part of the shuttling optical path formed after the reflection at the surface D to pass through the area R, the shuttling optical path being an optical path of the light reflected by surface A, reflected by surface C and then impinging again on the surface A. For example, the display optical system can be designed such that the central-viewing-angle principal ray that has entered the area R from the original image proceeds on an optical path that coincides with the shuttling optical path and then emerges from the area R.

Another way to reduce ghost light or flare light is to minimize the amount of light proceeding toward the exit pupil S by designing the display optical system such as to satisfy the condition (1) mentioned in Embodiment 1, regardless of the effect of absorbing the unnecessary light of the polarizing plate 16. However, at least one of the surfaces C and D need not necessarily be decentered. Even if the surface C is a non-decentered reflective surface which reflects the central-viewing-angle principal ray such that $\theta1=0$, $\theta1$ being an angle formed by a portion of the central-viewing-angle principal ray proceeding toward the surface C and a portion immediately after being reflected by the surface C, satisfying the condition (1) can prevent the central-viewing-angle principal ray that first impinges on the surface B from the image-forming element 10 from being observed by the observer as ghost light or flare light.

While the surfaces A, B, C, and D are all curved surfaces having a curvature in this embodiment, one of these may be a planar surface. It is, however, preferable that all of these surfaces have a curvature since they can contribute to image formation and aberration correction, which makes it easier to configure a display optical system with high image forming performance using a small number of surfaces.

Moreover, the display optical system in this embodiment is configured using thin optical elements 11, 12, 13, and 14 such that the area R surrounded by the surfaces A, B, and C and an area between the surfaces B and D are filled with air, thereby enabling reduction of the weight of the display optical system.

The following configuration can be employed, combining Embodiment 1 and Embodiment 2. The quarter-wave plate 15 of Embodiment 2 is disposed inside the second optical element 2 in Embodiment 1, and the first optical element 1 in Embodiment 1 is provided with a polarization splitting function on the surface C. The polarizing plate 16 is disposed between the surface A and the exit pupil S. This configuration can improve light-use efficiency.

Embodiment 3

Figure 7:
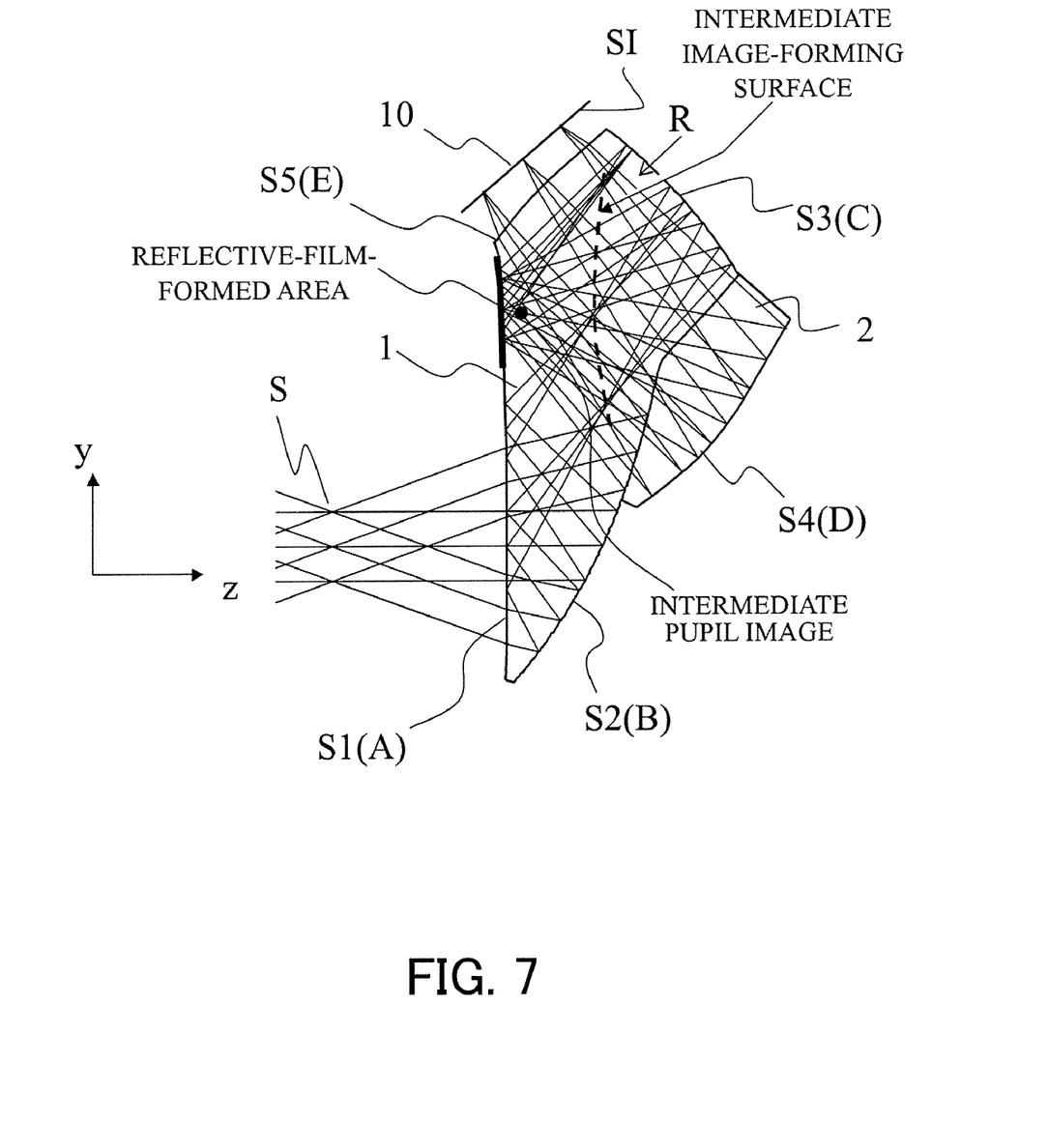
FIG. 7 is a sectional view of a display optical system that is a third embodiment (Embodiment 3) of the present invention and an image display apparatus using the same.

FIG. 7 shows the configuration of an image display apparatus having a display optical system that is a third embodiment (Embodiment 3) of the present invention.

In FIG. 7, reference numerals 1 and 2 denote a first optical element and a second optical element, respectively, which are prism-shaped elements filled thereinside with a medium having a refractive index of n. Reference numeral 10 denotes an image-forming element that forms an original image. Reference symbol S denotes an exit pupil of the display optical system.

This embodiment differs from Embodiment 1 in that the first optical element 1 has a surface E in addition to three surfaces A, B, and C. Further, this embodiment differs from Embodiment 1 in that a partial area of the surface A (hereinafter referred to as reflective-film-formed area) is formed thereon with a reflective film, and that the surface C is formed thereon not with a half-transmissive reflective film but simply with a reflective film.

Light that has emerged from the image-forming element 10 (surface SI) is transmitted through the surface E (S5) and then enters the first optical element 1 (area R). The light that entered the first optical element 1 is not reflected by the surface B (S2) but is transmitted therethrough (passes through the first optical element 1) to enter the second optical element 2. The light that entered the second optical element 2 is reflected by the surface D (S4). The light reflected by the surface D is transmitted through the surface B to return into the first optical element 1, and then is reflected by the reflective-film-formed area of the surface A (S1).

The light reflected by the reflective-film-formed area of the surface A is reflected by the surface C (S3) to proceed again to the surface A. Part of the light that reached the surface A is reflected by the reflective-film-formed area thereof, while the other part of the light impinges on a partial area of the surface A on which the reflective film is not formed (hereinafter referred to as non-reflective-film-formed area) at an incident angle of arcsin (1/n) or more to be internally totally reflected thereby. The light reflected by the reflective-film-formed area and the non-reflective-film-formed area is reflected by the surface B, and then impinges on the surface A (non-reflective-film-formed area) at an incident angle smaller than the angle of arcsin (1/n) to be transmitted therethrough toward the exit pupil S.

Also in this embodiment, the surfaces A, C, B, and D respectively correspond to a first surface, a second surface, a third surface, and a fourth surface.

In this embodiment, the surfaces A, B, C, and D are all decentered relative to a central-viewing-angle principal ray. That is, the central-view-angle principal ray does not perpendicularly impinge on the respective surfaces A to D to be perpendicularly reflected thereby, but impinges thereon at a predetermined angle to be reflected thereby. This embodiment may also be configured such as to satisfy the condition (1).

In this embodiment, the surfaces A, B, C, and D are all curved surfaces having a curvature. Respective functions of these curved surfaces enable an observer to observe an enlarged image of the original image formed on the image-forming element 10.

How image formation is performed in this embodiment will be described below.

A light flux that has emerged from the image-forming element 10 enters the first optical element 1 with divergence reduced due to a convex lens effect of the surface E. The light flux passes through the first optical element 1 to enter the second optical element 2 from the surface B, and then proceeds toward the reflective surface D. The light flux reflected by the reflective surface D while being subjected to a collecting effect by a concave surface shape thereof is transmitted through the surface B to return into the first optical element 1. The light flux forms an intermediate pupil image and is collected at the vicinity of the reflective-film-formed area on the surface A.

After that, the light reflected by the reflective-film-formed area on the surface A having a convex surface shape with a small curvature is reflected by the surface C having a concave surface shape to form an intermediate image. Further, the light reaching the reflective-film-formed area on the surface A is reflected thereby, while the light reaching the non-reflective-film-formed area on the surface A impinges thereon at an incident angle of arcsin (1/n) or more to be internally totally reflected thereby.

The light is subsequently reflected by part having a concave surface shape of the reflective surface B and then impinges on the surface A at an incident angle smaller than the angle of arcsin (1/n) to be transmitted therethrough to emerge from the first optical element 1. The light that has emerged from the first optical element 1 forms the exit pupil S. The observer who places his/her eye at the position of the exit pupil S can observe an enlarged virtual image of the intermediate image primarily by the function of the reflective surface B having a concave surface shape with a large curvature.

It is preferable that the light flux folded by the reflective surfaces A and B after forming the intermediate image form its optical path such that part of that light flux crosses part of the intermediate image. In this embodiment, the light flux forming an upper viewing angle (positive viewing angle in a y-axis direction) crosses the intermediate image of a lower viewing angle (negative viewing angle in the y-axis direction). Such a configuration can increase the curvature of the part having a concave surface shape of the reflective surface B to reduce the size of the first optical element 1, which is effective for miniaturizing the entire display optical system.

The first optical element 1 in this embodiment includes a part serving as an ocular optical system and another part serving as a relay optical system. The ocular optical system introduces the light flux after forming the intermediate image toward the exit pupil S (part from the second reflection on the surface A via the reflection on the surface B to the transmission through the surface A). The first optical element 1 is surrounded by the three surfaces A, B, and C each having at least a reflection function. The part serving as the ocular optical system in the first optical element 1 also folds the optical path of effective light in a visual axis direction (z-axis direction) by the second reflection on the surface A and the reflection on the surface B. This enables reduction in thickness of the display optical system.

Moreover, in the first optical element 1, the light (central-viewing-angle principal ray) after forming the intermediate image returns on the optical path on which it has proceeded before the formation of the intermediate image (optical path from the surface B [transmission] to the surface A [first reflection]) to proceed from the surface A (second reflection) to the surface B (reflection). That is, the first optical element 1 has the surface C as a returning reflective surface that causes the light to return on the optical path as described above.

In this embodiment, the optical path from the surface A (first reflection) via the surface C (reflection) to the surface A (second reflection) corresponds to a shuttling optical path formed between the first and second surfaces.

The following effect is defined as a returning reflective effect of the surface C. The reflection direction of the central-viewing-angle principal ray with respect to a normal to the surface A at its hit point thereon when the light is reflected by the surface A for the first time is defined as a first reflection direction. Likewise, the reflection direction of the central-viewing-angle principal ray with respect to a normal to the surface A at its hit point thereon when the light reflected by the surface C is reflected (re-reflected) by the surface A for the second time is defined as a second reflection direction. The returning reflective effect of the surface C is an effect that causes the light to be reflected such that the first and second reflection directions are opposite to each other.

In other words, the returning reflective effect of the surface C reflects the light such that the central-view-angle principal ray of the light impinging (again) on the surface A proceeds (is re-reflected) in a direction (negative side in the y-axis direction) opposite to, with respect to the normal to the surface A at its hit point thereon, a direction (positive side in the y-axis direction) in which the central-view-angle principal ray has previously reflected by the surface A.

In this embodiment, this returning reflective effect of the surface C enables the optical path in the relay optical system, in particular the optical path from an intermediate pupil-image-forming position (position where principal rays forming respective viewing angles are collected) to an intermediate image-forming surface (surface formed by connecting points at which effective light fluxes forming respective viewing angles are collected), and the optical path in the ocular optical system to be arranged within the first optical element 1. This enables miniaturization of the entire display optical system.

This embodiment further includes the surface D outside the area R surrounded by the three surfaces A, B, and C. The surface D is provided to configure the display optical system such that the light that has emerged from the image-forming element 10 and passed through the first optical element 1 (area R) once is returned to the first optical element 1. The display optical system in this embodiment is configured such that the light flux that has entered the first optical element 1 from the surface E is transmitted through the surface B, is reflected by the surface D, and then is again transmitted through the surface B to be collected at the vicinity of the reflective-film-formed area of the surface A.

Further, the optical path of the light flux that has entered the first optical element 1 from the surface E and is transmitted through the surface B to reach the surface D and the above-mentioned optical path from the surface A (first reflection) via the returning reflective surface C (reflection) to the surface A (second reflection) intersect each other within the area R surrounded by the three surfaces A, B, and C. In other words, the light that has entered the area R from the original image emerges from the area R by passing through at least part of the shuttling optical path formed after the reflection on the surface D, i.e., the optical path of the light that is reflected by the surface A, subsequently reflected by the surface C and then impinges again on the surface A.

Such an arrangement of the respective surfaces enables most of the optical path to be accommodated within the first optical element 1. As a result, the display optical system is reduced in size.

Furthermore, also in this embodiment, in the area R surrounded by the three surfaces A, B, and C, the following three optical paths overlap each other: an earlier optical path portion from the original image to the intermediate pupil-image-forming position in the relay optical system from the original image to a position where the intermediate image is formed (intermediate image-forming position); a later optical path portion from the intermediate pupil-image-forming position to the intermediate image-forming position in the relay optical system; and the optical path in the ocular optical system.

Such a long optical path is thus formed within the small area R with this configuration, resulting in miniaturization of the entire display optical system. Conversely, the optical path length is increased relative to the size of the display optical system. This reduces the sensitivity of the optical surfaces, thereby enabling realization of a display optical system whose tolerance level is lowered, that is, a display optical system more easily producible.

Moreover, also in this embodiment, since the surfaces A, B, C, and D are decentered reflective surfaces having a curvature, decentering aberrations are generated by these surfaces A, B, C, and D. It is therefore preferable to form these surfaces A, B, C, and D in a rotationally asymmetric shape to correct the decentering aberrations.

In this embodiment, some loss of light amount is generated by the reflection and transmission at the surface B that is a half-transmissive reflective surface. However, this embodiment can reduce the amount of light loss since the reflection at the reflective surface C is a normal reflection.

Further, if linearly polarized light emerges from the image-forming element 10, providing a quarter-wave plate in the vicinity of the surface C and providing a reflective characteristic to the surface B similarly to that of a PBS can further reduce the amount of light loss.

Note that the second reflection at the surface A is not limited to the internal total reflection. The surface A can be a half-transmissive reflective surface to arbitrarily cause effective light used for image display to be reflected thereby or transmitted therethrough such that an optical path similar to that described in this embodiment is formed. However, it is preferable that the reflection at the surface A be internal total reflection for reduction of the amount of light loss.

While the surfaces A, B, C, and D are all curved surfaces having a curvature in this embodiment, one of these may be a planar surface. It is, however, preferable that all of these surfaces have a curvature since they can contribute to image formation and aberration correction, which makes it easier to configure a display optical system with high image forming performance using a small number of surfaces.

While the first and second optical elements 1 and 2 are made of materials having the same refractive index n, they may be formed of materials having different refractive indexes n1 and n2 from each other.

In this embodiment, the second optical element 2 is disposed above the visual axis. This makes it easier to reduce the size of an image-pickup optical system for a video see-through HMD in which an optical axis of the image-pickup optical system is aligned with the visual axis of the display optical system.

Embodiment 4

Figure 8:
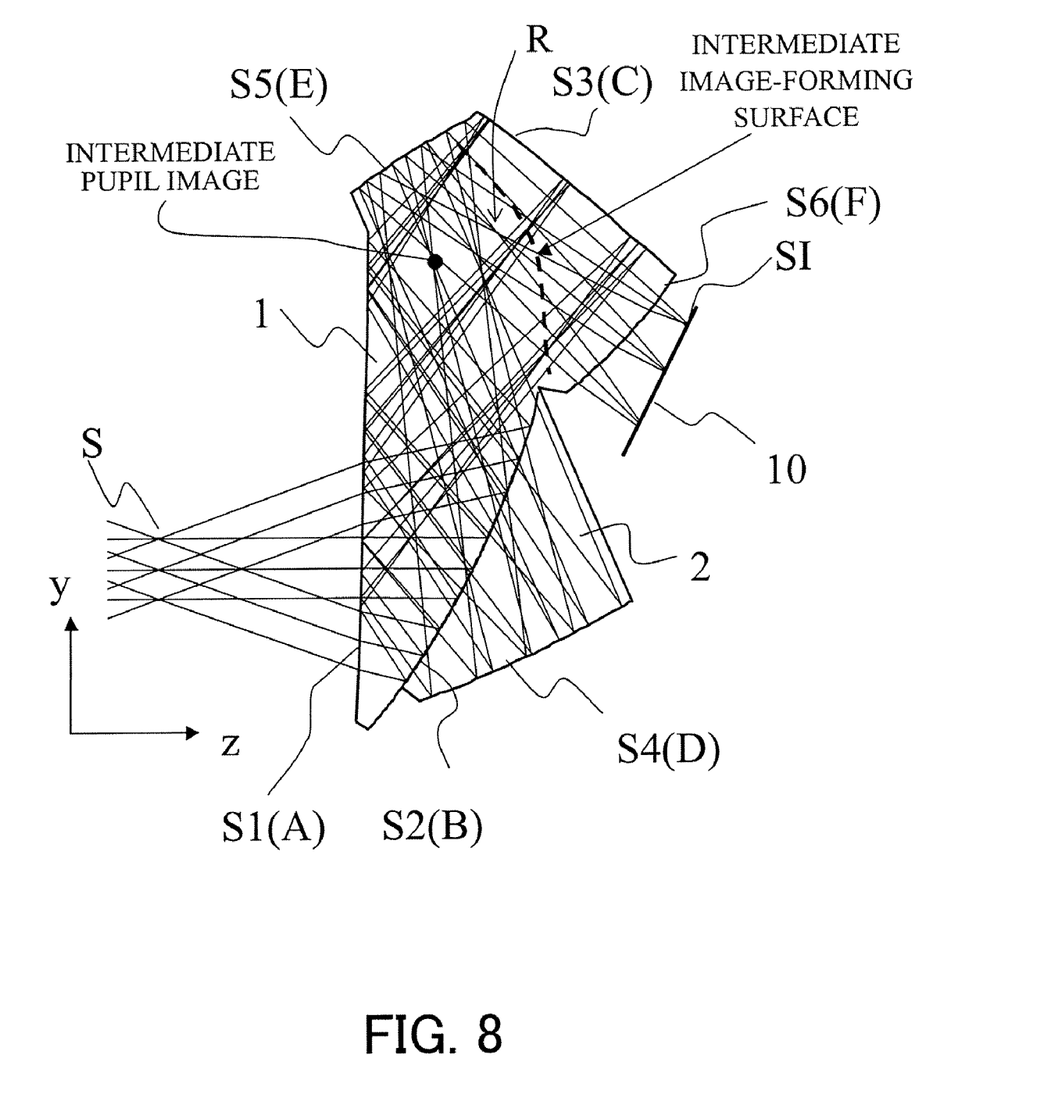
FIG. 8 is a sectional view of a display optical system that is a fourth embodiment (Embodiment 4) of the present invention and an image display apparatus using the same.

FIG. 8 shows the configuration of an image display apparatus having a display optical system that is a fourth embodiment (Embodiment 4) of the present invention.

In FIG. 8, reference numerals 1 and 2 denote a first optical element and a second optical element, respectively, which are prism-shaped elements filled thereinside with a medium having a refractive index of n. Reference numeral 10 denotes an image-forming element that forms an original image. Reference symbol S denotes an exit pupil of the display optical system.

This embodiment differs from Embodiment 1 in that the first optical element 1 has a reflective surface E and a transmissive surface F in addition to three surfaces A, B, and C. Further, this embodiment differs from Embodiment 1 in that the surface C is formed thereon not with a half-transmissive reflective film but with a reflective film.

Light that has emerged from the image-forming element 10 (surface SI) enters the first optical element 1 from the transmissive surface F (S6), is reflected by the reflective surface E (S5) and then is transmitted through the surface B (S2) to emerge from the first optical element 1 (i.e., to pass through the first optical element 1). The light that has emerged from the first optical element 1 enters the second optical element 2.

The light that has entered the second optical element 2 is reflected by the surface D (S4), transmitted through the surface B to return into the first optical element 1, and then impinges on the surface A (S1) at an incident angle of arcsin (1/n) or more to be internally totally reflected thereby toward the surface C (S3).

The light reflected by the surface C proceeds again to the surface A and then impinges on the surface A at an incident angle of arcsin (1/n) or more to be internally totally reflected thereby toward the surface B. After that, the light is reflected by the surface B and impinges on the surface A at an incident angle smaller than the angle of arcsin (1/n) to be transmitted therethrough toward the exit pupil S.

Also in this embodiment, the surfaces A, C, B, and D respectively correspond to a first surface, a second surface, a third surface, and a fourth surface.

In this embodiment, the surfaces A, B, C, D and E are all decentered relative to a central-viewing-angle principal ray. That is, the central-view-angle principal ray does not perpendicularly impinge on the respective surfaces A to E to be perpendicularly reflected thereby, but impinges thereon at a predetermined angle to be reflected thereby. This embodiment may also be configured such as to satisfy the condition (1).

In this embodiment, the surfaces A, B, C, D, E, and F are all curved surfaces having a curvature. Respective functions of these curved surfaces enable an observer to observe an enlarged image of the original image formed on the image-forming element 10.

How image formation is performed in this embodiment will be described below.

A light flux that has emerged from the image-forming element 10 enters the first optical element 1 with divergence reduced due to a convex lens effect of the surface F. The light flux that has entered the first optical element 1 is reflected by the reflective surface E having a concave surface shape to be further collected to form an intermediate pupil image and then proceeds toward the surface B. The light flux is transmitted through the surface B to enter the second optical element 2 therefrom, is reflected by the reflective surface D while being subjected to a collecting effect by a concave surface shape thereof and then is transmitted through the surface B to return into the first optical element 1.

The light flux that has returned into the first optical element 1 is internally totally reflected by the surface A having a small curvature, and then is reflected by the surface C having a concave surface shape with a small curvature to form an intermediate image. After that, the light is internally totally reflected by the surface A, is reflected by the reflective surface B having a concave surface shape, and then transmitted through the surface A to emerge from the first optical element 1 to form the exit pupil S. An observer who places his/her eye at the position of the exit pupil S can observe an enlarged virtual image of the intermediate image primarily by the function of the reflective surface B having a concave surface shape with a large curvature.

The first optical element 1 in this embodiment includes a part serving as an ocular optical system and another part serving as a relay optical system. The ocular optical system introduces the light flux after forming the intermediate image toward the exit pupil S (part from the second reflection on the surface A via the reflection on the surface B to the transmission through the surface A). The first optical element 1 is surrounded by the three surfaces A, B, and C each having at least a reflection function. The part serving as the ocular optical system in the first optical element 1 also folds the optical path of effective light in a visual axis direction (z-axis direction) by the second reflection on the surface A and the reflection on the surface B. This enables reduction in thickness of the display optical system.

Moreover, in the first optical element 1, the light (central-viewing-angle principal ray) after forming the intermediate image returns on the optical path on which it has proceeded before the formation of the intermediate image (optical path from the surface B [transmission] to the surface A [first reflection]) to proceed from the surface A (second reflection) to the surface B (reflection). That is, the first optical element 1 has the surface C as a returning reflective surface that causes the light to return on the optical path as described above.

In this embodiment, the optical path from the surface A (first reflection) via the surface C (reflection) to the surface A (second reflection) corresponds to a shuttling optical path formed between the first and second surfaces.

The following effect is defined as a returning reflective effect of the surface C. The reflection direction of the central-viewing-angle principal ray with respect to a normal to the surface A at its hit point thereon when the light is reflected by the surface A for the first time is defined as a first reflection direction. Likewise, the reflection direction of the central-viewing-angle principal ray with respect to a normal to the surface A at its hit point thereon when the light reflected by the surface C is reflected (re-reflected) by the surface A for the second time is defined as a second reflection direction. The returning reflective effect of the surface C is an effect that causes the light to be reflected such that the first and second reflection directions are opposite to each other.

In other words, the returning reflective effect of the surface C reflects the light such that the central-view-angle principal ray of the light impinging (again) on the surface A proceeds (is re-reflected) in a direction (negative side in a y-axis direction) opposite to, with respect to the normal to the surface A at its hit point thereon, a direction (positive side in the y-axis direction) in which the central-viewing-angle principal ray has previously reflected by the surface A.

In this embodiment, this returning reflective effect of the surface C enables the optical path in the relay optical system, in particular the optical path from an intermediate pupil-image-forming position (position where the principal rays forming respective viewing angles are collected) to the intermediate image-forming surface, and the optical path in the ocular optical system to be arranged within the first optical element 1. This enables miniaturization of the entire display optical system.

This embodiment further includes the surface D outside the area R surrounded by the three surfaces A, B, and C. The surface D is provided to configure the display optical system such that the light that has emerged from the image-forming element 10 and passed through the first optical element 1 (area R) once is returned into the first optical element 1.

The display optical system in this embodiment is configured such that the light flux that has entered on the first optical element 1 from the transmissive surface F is reflected by the surface E, is transmitted through the surface B, is reflected by the reflective surface D, and then is again transmitted through the surface B to proceed toward the surface A.

The optical path from the surface F to the surface E and the optical path from the surface E via the transmission through the surface B to the reflective surface D respectively intersect with the optical path from the surface A (first reflection) via the returning reflective surface C (reflection) to the surface A (second reflection) within the area R (first optical element 1) surrounded by the three surfaces A, B, and C.

In other words, the light that entered the area R from the original image emerges from the area R by passing through at least part of the shuttling optical path formed after the reflection on the surface D, i.e., the optical path of the light that is reflected by the surface A, subsequently reflected by the surface C and then impinges again on the surface A.

Such an arrangement of the respective surfaces enables most of the optical path to be accommodated within the first optical element 1. As a result, the display optical system is reduced in size.

Furthermore, also in this embodiment, in the area R surrounded by the three surfaces A, B, and C, the following three optical paths overlap each other: an earlier optical path portion from the original image to the intermediate pupil-imageforming position in the relay optical system from the original image to an intermediate image-forming position; a later optical path portion from the intermediate pupil-image-forming position to the intermediate image-forming position in the relay optical system; and the optical path in the ocular optical system. With regard to the optical path of the central-viewing-angle principal ray, the earlier and later optical path portions in the relay optical system and the optical path in the ocular optical system intersect each other within the area R surrounded by the three surfaces A, B, and C.

Such a long optical path is thus formed within the small area R with this configuration, resulting in miniaturization of the entire display optical system. Conversely, the optical path length is increased relative to the size of the display optical system. This reduces the sensitivity of the optical surfaces, thereby enabling realization of a display optical system whose tolerance level is lowered, that is, a display optical system more easily producible.

Also in this embodiment, since the surfaces A, B, C, and D are decentered reflective surfaces having a curvature, decentering aberrations are generated by these surfaces A, B, C, and D. It is therefore preferable to form these surfaces A, B, C, and D in a rotationally asymmetric shape to correct the decentering aberrations. Further, this embodiment is also configured such that the light flux that enters the first optical element 1 from the surface F and then is reflected by the surface E and the surface B does not proceed toward the exit pupil S as in Embodiment 1. This suppresses generation of ghost light or flare light.

In this embodiment, some loss of light amount is generated by the reflection and transmission at the surface B that is a half-transmissive reflective surface. However, this embodiment can reduce the amount of light loss since the reflection at the reflective surface C is a normal reflection.

Further, if linearly polarized light emerges from the image-forming element 10, providing a quarter-wave plate in the vicinity of the surface C and providing a reflective characteristic to the surface B similarly to that of a PBS can further reduce the amount of light loss.

Note that the second reflection at the surface A is not limited to the internal total reflection. The surface A can be a half-transmissive reflective surface to arbitrarily cause effective light used for image display to be reflected thereby or transmitted therethrough such that an optical path similar to that described in this embodiment is formed. However, it is preferable that the reflection at the surface A be internal total reflection for reduction of the amount of light loss.

While the surfaces A, B, C, and D are all curved surfaces having a curvature in this embodiment, one of these may be a planar surface. It is, however, preferable that all of these surfaces have a curvature since they can contribute to image formation and aberration correction, which makes it easier to configure a display optical system with high image forming performance using a small number of surfaces.

While the first and second optical elements 1 and 2 are made of materials having the same refractive index n, they may be formed of materials having different refractive indexes n1 and n2 from each other.

In this embodiment, the reflection at surface C may be such that the central-viewing-angle principal ray is incident and reflected perpendicularly.

In each of the embodiments described above, the display optical system includes the fourth surface D provided outside the area R surrounded by the first to third surfaces A, B, and C. The display optical system causes the light from the original image to pass through the area R once and then to be reflected by the surface D such that the light returns into the area R, and thereby forms the shuttling optical path between the surfaces A and C. This enables a long optical path length obtained by the shuttling optical path to be even longer without increasing the size of the display optical system, or with the size being made even smaller. Therefore, each embodiment can realize a small display optical system and a small image display apparatus that provide an even wider viewing angle than those of conventional ones.

Moreover, in each of the above embodiments, the display optical system is configured such that at least part of the light that has entered the area R from the original image is transmitted through the surface B to proceed toward the surface D. This enables realization of an even smaller display optical system and an even smaller image display apparatus that provide a wide viewing angle.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2007-176626, filed on Jul. 4, 2007, which is hereby incorporated by reference herein in its entirety.

What is claimed is:

1. A display optical system that introduces light from an original image to an exit pupil, comprising:
    a first surface, a second surface, and a third surface each having at least a reflection function; and
    a fourth surface having a reflection function and disposed outside an inside area surrounded by the first, second, and third surfaces,
    wherein the display optical system is configured such that:
    the light from the original image passes through the inside area and then is reflected by the fourth surface to return into the inside area;
    the light that has returned into the inside area is reflected by the first surface and then is reflected by the second surface toward the first surface to impinge again thereon;
    the light impinging again on the first surface is re-reflected thereby such that a central-viewing-angle principal ray of the light proceeds in a direction opposite to, with respect to a normal to the first surface at its hit point thereon, a direction in which the central-viewing-angle principal ray has previously reflected by the first surface; and
    the light re-reflected by the first surface is reflected by the third surface to proceed toward the exit pupil.

2. A display optical system according to claim 1, wherein the light that has entered the inside area from the original image passes through at least part of an optical path, which is formed after reflection by the fourth surface, of the light that is reflected by the first surface, is reflected by the second surface and then impinges again on the first surface.

3. A display optical system according to claim 1, wherein at least part of the light that has entered the inside area from the original image is transmitted through the third surface to proceed toward the fourth surface.

4. An image display apparatus, comprising:
    an image-forming element that forms an original image; and
    a display optical system according to claim 1.

* * * * *